Patented Oct. 15, 1929

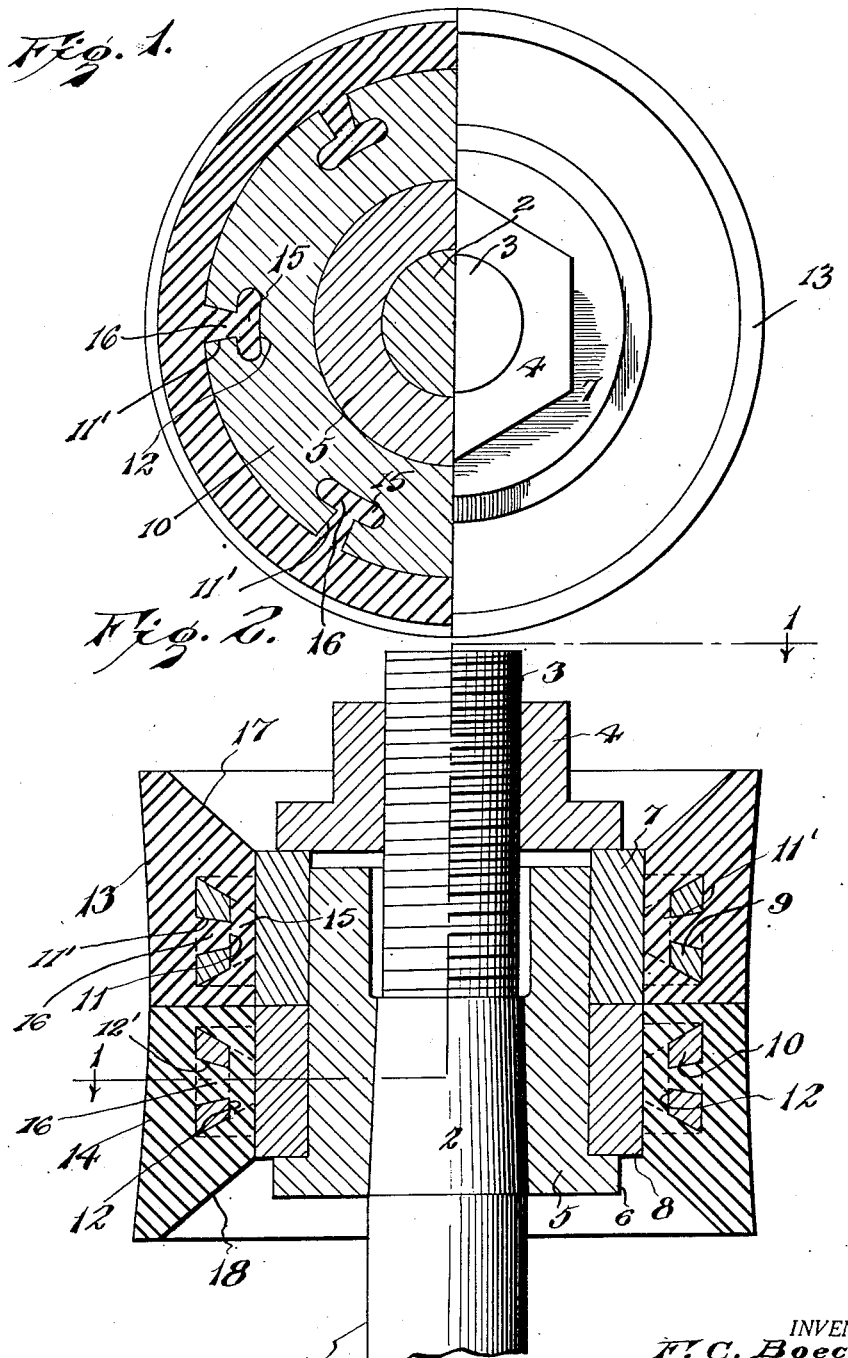

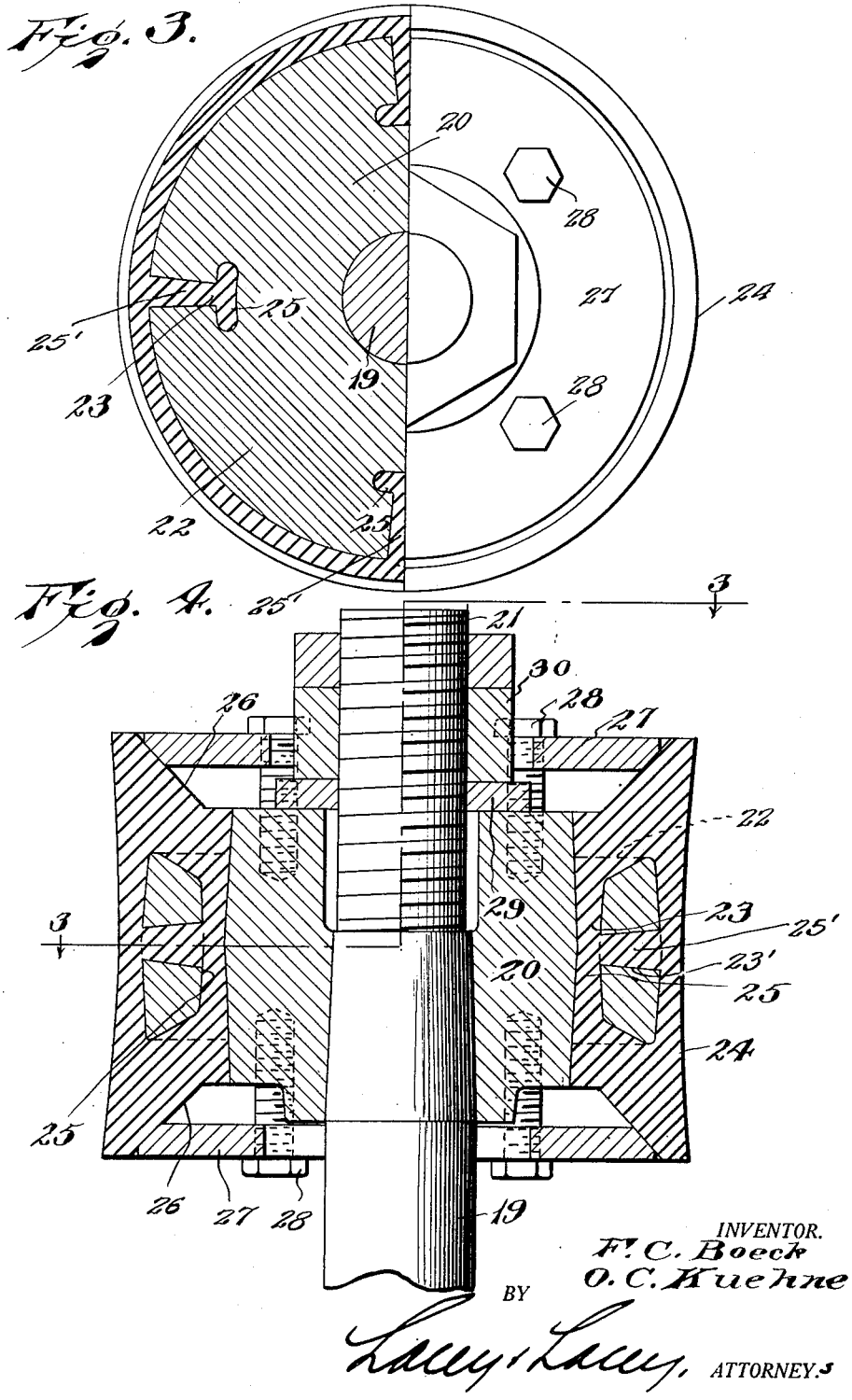

1,732,188

UNITED STATES PATENT OFFICE

FRED C. BOECK AND OSCAR C. KUEHNE, OF SAN ANTONIO, TEXAS

PUMP PISTON

Application filed August 23, 1928. Serial No. 301,610.

The present invention is directed to improvements in pump pistons.

The primary object of the invention is to provide a device of this character so constructed that the packing rings when worn can be conveniently removed and new ones substituted therefor.

Another object of the invention is to provide a pump piston provided with rubber packing rings constructed in such manner that they can be firmly secured to the piston rod without the aid of follower plates and heads.

Another object of the invention is to provide a pump piston which is simple in construction, efficient in operation, durable, and one which can be manufactured at a minimum cost.

Another object of the invention is to provide a pump piston so constructed that metallic parts thereof will not come in contact with the cylinder wall, thus reducing wear and preventing scoring of the cylinder wall.

With these and other objects in view, this invention resides in the novel features of construction, formation, combination and arrangement of parts to be hereinafter more fully described, claimed and illustrated in the accompanying drawings, in which:—

Figure 1 is a view partly in section and partly in elevation and taken on the line 1—1 of Figure 2.

Figure 2 is a longitudinal sectional view through the piston.

Figure 3 is a view partly in section and partly in elevation of a modified form of the invention and taken on line 3—3 of Figure 4.

Figure 4 is a longitudinal sectional view through the modified form of the invention.

Referring to the drawings, and particularly to Figures 1 and 2, 1 designates a portion of the piston rod, tapered as at 2, there being a threaded extension 3 formed upon the end of the piston rod for engagement with the clamping nut 4. A head 5 is provided and is fitted on the tapered portion of the rod, said head having upon one end an annular shoulder 6, the purpose of which will be later explained.

Removably engaged upon the head 5 is a pair of rings 7 and 8, said rings having reduced rims 9 and 10, respectively. These rims are provided at intervals with vertical openings 11 and 12 and horizontal openings 11′ and 12′, the inner ends of the latter opening into the former, six of which are employed, but it will, of course, be understood that the number may be increased if desired.

These rings have associated therewith rubber packing rings 13 and 14, respectively, said packing rings being applied to said rings by vulcanization. During the vulcanizing process a portion of the material forming the packing rings will enter the openings 11, 12, 11′ and 12′, and provide bonds 15 and 16 which will obviously maintain the rings in fixed position.

The packing ring 13 is provided with an annular beveled face 17 while the ring 14 is provided with a similar face 18 in order that the fluid being pumped will act upon said faces to tend to force the packing rings in intimate contact with the cylinder wall.

The ring 8 rests upon the shoulder 6 and movement thereof in one direction is positively limited, and since the nut engages the ring 7, both rings will be rigidly connected with the head 5.

It will be obvious that should both of the packing rings 13 and 14 wear that they can be conveniently removed upon removal of the nut 4 and a new one substituted therefor, or it may be that only one of the packing rings may wear, and since the same can be readily replaced, considerable expense will be saved by the construction set forth.

In the modified form of the invention as shown in Figures 3 and 4, the rod 19 has removably engaged thereon the head 20, said head having a threaded extension 21. The head 20 is provided with a reduced rim 22 provided at intervals with vertical openings 23 and horizontal openings 23'. To this rim is secured the rubber packing ring 24, a portion of the material forming the ring entering the openings 23 and 23' and constituting bonds 25 and 25' which serve to firmly unite the head and ring.

The opposite ends of the packing rings are provided with recesses 26 which confine the circular plates 27, said plates being connected to the head by cap screws 28. Obviously, upon adjusting the cap screws the walls of the recesses will be expanded for tight engagement with the cylinder wall. The head 20 is retained upon the rod by the washer 29 which is interposed between the clamping nut 30 carried by the extension 21 and said head.

Should the packing ring 24 wear or become broken the same can be conveniently removed and a new one substituted therefor without disturbing or replacing any of the other parts of the device.

From the foregoing, it is thought that the construction, operation and many advantages of the herein described invention will be apparent to those skilled in the art, without further description, and it will be understood that various changes in the size, shape and proportion and minor details of construction may be resorted to without departing from the spirit or sacrificing any of the advantages of the invention.

What is claimed is:—

1. A pump piston comprising a rod, a head removably engaged upon the rod, rings removably mounted on the head, said rings having reduced rims, and rubber packing rings secured to the rims.

2. A pump piston comprising a rod, a pair of rings removably engaged upon the rod and having rims, said rims having openings therein, and packing rings upon the rims and having bonds engaging said openings.

3. A pump piston comprising a rod, a head engaged upon the rod and having an annular shoulder upon one end, a pair of rings removably engaged upon the head, one of said rings abutting the shoulder, packing rings secured to the said rings, and a nut upon the rod for securing the rings upon the head.

4. A pump piston comprising a rod, a head removably mounted upon the rod, rings removably engaged upon the head, said rings having rubber packing rings carried thereby, said packing rings having certain of their ends provided with beveled faces.

5. A pump piston comprising a rod, a head removably fitted on the rod, a ring confining the head and having a reduced annular rim, said rim having a plurality of circularly alined openings therein, and an elastic packing ring vulcanized upon the rim with parts thereof in the openings.

6. A pump comprising a rod, a head carried by the rod, rings engaged with the head, rims carried by the head and having vertical and horizontal openings formed therein, the inner ends of the horizontal openings communicating with the vertical openings, elastic packing rings vulcanized upon the rims and having portions filling the openings and constituting bonds.

In testimony whereof we affix our signatures.

FRED C. BOECK. [L. S.]
OSCAR C. KUEHNE. [L. S.]